(12) United States Patent
Jones et al.

(10) Patent No.: US 7,316,122 B1
(45) Date of Patent: Jan. 8, 2008

(54) TRAY FOR PRODUCING PARTICULATE FOOD PRODUCTS

(75) Inventors: Curt D. Jones, Brentwood, TN (US); Stan Jones, Vienna, IL (US)

(73) Assignee: Dippin' Dots, Inc., Paducah, KY (US)

( * ) Notice: Subject to any disclaimer, the term of this patent is extended or adjusted under 35 U.S.C. 154(b) by 736 days.

(21) Appl. No.: 10/752,073

(22) Filed: Jan. 6, 2004

(51) Int. Cl.
 F25C 1/12 (2006.01)
(52) U.S. Cl. .................................... 62/347; 239/556
(58) Field of Classification Search .............. 62/74, 62/303, 347, 548, 556–557
See application file for complete search history.

(56) References Cited

U.S. PATENT DOCUMENTS

| | | |
|---|---|---|
| 1,467,615 A | 9/1923 | Fairbanks |
| 1,538,730 A | 5/1925 | Obersohn et al. |
| 1,612,167 A | 12/1926 | Beardsley et al. |
| 2,059,733 A | 11/1936 | Heisser |
| 2,263,259 A | 11/1941 | Boosey |
| 2,448,802 A | 9/1948 | Holzcker |
| 2,507,873 A | 5/1950 | Ward |
| 2,541,984 A | 2/1951 | Chandler |
| 2,545,140 A | 3/1951 | Escher |
| 2,708,055 A | 5/1955 | Alexander |
| 2,715,484 A | 8/1955 | Alexander |
| 2,875,588 A | 3/1959 | Berger |
| 2,893,605 A | 7/1959 | Anderson |
| 3,023,171 A | 2/1962 | Smith |
| 3,057,522 A | 10/1962 | Reed |
| 3,060,510 A | 10/1962 | Fischer et al. |
| 3,089,316 A | 5/1963 | Robbins |
| 3,097,501 A | 7/1963 | Pappas |
| 3,162,019 A | 12/1964 | Porter et al. |
| 3,228,838 A | 1/1966 | Rinfret et al. |
| 3,291,076 A | 12/1966 | Flanigan et al. |
| 3,320,694 A | 5/1967 | Biron |
| 3,344,617 A | 10/1967 | Rinfret et al. |
| 3,360,384 A | 12/1967 | Kurzinski et al. |
| 3,613,775 A * | 10/1971 | Curtis .................. 165/46 |
| 3,647,478 A | 3/1972 | Minor et al. |

(Continued)

FOREIGN PATENT DOCUMENTS

CA 964921 3/1975

(Continued)

OTHER PUBLICATIONS

Wiley Encyclopedia of Food Science and Technology; pp 858-860, and 1336.

(Continued)

Primary Examiner—William E. Tapolcai
(74) Attorney, Agent, or Firm—Stockwell & Smedley, PSC (57) ABSTRACT

A tray assembly for use in feeding liquid composition to a freezing chamber is disclosed. The tray has a plurality of projections that are designed to provide regulated discharge of the liquid composition from the tray and to feed the liquid composition into the freezing chamber in uniformly sized drops. The projections area each downwardly disposed in relation to the tray. The tray has a bottom wall with a plurality of orifices, where each orifice is associated with a corresponding projection. These projections are uniform in size and can be formed using computerized welding techniques. An alternate embodiment in which the tray is pressurized is also disclosed.

26 Claims, 5 Drawing Sheets

U.S. PATENT DOCUMENTS

| | | |
|---|---|---|
| 3,756,372 A | 9/1973 | Mertens |
| 3,832,764 A | 9/1974 | Fletcher et al. |
| 3,857,974 A | 12/1974 | Aref et al. |
| 3,889,701 A | 6/1975 | Mueller |
| 3,896,923 A | 7/1975 | Griffith |
| 3,955,596 A | 5/1976 | Diaz |
| 4,009,740 A | 3/1977 | Michielli |
| 4,031,262 A | 6/1977 | Nakayama et al. |
| 4,077,227 A | 3/1978 | Larson |
| 4,109,966 A | 8/1978 | Boyhont et al. |
| 4,114,427 A | 9/1978 | Iguchi et al. |
| 4,159,721 A | 7/1979 | Horter |
| 4,218,786 A | 8/1980 | Taglarino |
| 4,220,242 A | 9/1980 | Forsberg |
| 4,228,802 A | 10/1980 | Trott |
| 4,235,187 A | 11/1980 | Mirza |
| 4,251,547 A | 2/1981 | Liggett |
| 4,310,559 A | 1/1982 | Mita et al. |
| 4,344,361 A | 8/1982 | MacPhee et al. |
| 4,353,927 A | 10/1982 | Lovercheck |
| 4,363,223 A * | 12/1982 | Abbott ............... 62/303 |
| 4,380,284 A | 4/1983 | Ito et al. |
| 4,401,402 A | 8/1983 | Casperson |
| 4,408,944 A | 10/1983 | Christian |
| 4,445,627 A | 5/1984 | Horak |
| 4,446,651 A | 5/1984 | Spitz, Jr. et al. |
| 4,506,851 A | 3/1985 | Gupta et al. |
| 4,509,339 A | 4/1985 | Mehlan et al. |
| 4,565,100 A | 1/1986 | Malinoff |
| 4,569,204 A | 2/1986 | Ott et al. |
| 4,594,739 A | 6/1986 | Watts et al. |
| 4,613,275 A | 9/1986 | Karlowsky |
| 4,642,905 A | 2/1987 | Barlebo et al. |
| 4,655,047 A | 4/1987 | Temple et al. |
| 4,687,672 A | 8/1987 | Vitkovsky |
| 4,704,873 A | 11/1987 | Imaike et al. |
| 4,730,750 A | 3/1988 | Ficken |
| 4,738,687 A | 4/1988 | Smieskol et al. |
| 4,741,178 A | 5/1988 | Fujiu et al. |
| 4,748,817 A | 6/1988 | Oura et al. |
| 4,831,841 A | 5/1989 | Falk |
| 4,881,663 A | 11/1989 | Seymour |
| 4,920,764 A | 5/1990 | Martin |
| 4,957,123 A | 9/1990 | McHugh |
| 4,982,577 A | 1/1991 | Milankov et al. |
| 4,993,238 A | 2/1991 | Inagaki |
| 5,009,254 A | 4/1991 | Brunner |
| 5,027,698 A | 7/1991 | Chirnomas |
| 5,075,905 A | 12/1991 | Rutherford |
| 5,085,244 A | 2/1992 | Funk |
| 5,089,123 A | 2/1992 | DeVoe |
| 5,121,854 A | 6/1992 | Trouteaud et al. |
| 5,126,156 A | 6/1992 | Jones |
| 5,154,825 A | 10/1992 | Kupka |
| 5,203,614 A | 4/1993 | Robbins et al. |
| 5,219,445 A | 6/1993 | Bartenbach |
| 5,219,455 A | 6/1993 | Trucco |
| 5,224,415 A | 7/1993 | McFadden et al. |
| 5,232,027 A | 8/1993 | Tanaka et al. |
| 5,281,429 A | 1/1994 | Zevlakis |
| 5,305,615 A | 4/1994 | McFadden et al. |
| 5,307,640 A | 5/1994 | Fawzy et al. |
| 5,318,444 A | 6/1994 | Kuzub et al. |
| 5,319,939 A | 6/1994 | McFadden et al. |
| 5,348,606 A | 9/1994 | Hanaway et al. |
| 5,355,992 A | 10/1994 | Baig et al. |
| 5,378,483 A | 1/1995 | Fazio et al. |
| 5,400,614 A | 3/1995 | Feola |
| 5,403,611 A | 4/1995 | Tomita et al. |
| 5,405,054 A | 4/1995 | Thomas |
| 5,417,081 A | 5/1995 | Rudick et al. |
| 5,421,484 A | 6/1995 | Beach |
| 5,463,878 A | 11/1995 | Parekh et al. |
| 5,464,119 A | 11/1995 | Giuseppe et al. |
| 5,557,944 A | 9/1996 | Hirano et al. |
| 5,573,660 A | 11/1996 | Eicker et al. |
| 5,620,732 A | 4/1997 | Clemmings et al. |
| 5,657,684 A | 8/1997 | Chaikowsky |
| 5,657,852 A | 8/1997 | Bavington |
| 5,664,422 A | 9/1997 | Jones |
| 5,669,288 A | 9/1997 | Zittel et al. |
| 5,669,531 A | 9/1997 | Hagemeyer |
| 5,704,216 A | 1/1998 | Hirano et al. |
| 5,714,043 A | 2/1998 | Finley et al. |
| 5,718,119 A | 2/1998 | Wakita et al. |
| 5,722,529 A | 3/1998 | Manjunath et al. |
| 5,772,072 A | 6/1998 | Prescott et al. |
| 5,798,038 A | 8/1998 | Huber |
| 5,800,116 A | 9/1998 | Smith et al. |
| 5,813,242 A | 9/1998 | Lawrence et al. |
| 5,842,349 A | 12/1998 | Wakita et al. |
| 5,948,456 A | 9/1999 | Jones et al. |
| 5,958,493 A | 9/1999 | Grigoli |
| 5,988,357 A | 11/1999 | Memory et al. |
| 6,000,229 A | 12/1999 | Jones et al. |
| 6,041,611 A | 3/2000 | Palmer |
| 6,050,391 A | 4/2000 | Terry |
| 6,060,099 A | 5/2000 | Ito |
| 6,068,108 A | 5/2000 | Dudley |
| 6,089,747 A | 7/2000 | Huang |
| 6,103,287 A | 8/2000 | Soehnlen et al. |
| 6,145,701 A | 11/2000 | Van Der Merwe et al. |
| 6,174,550 B1 | 1/2001 | Fletcher et al. |
| 6,182,677 B1 | 2/2001 | Pignataro |
| 6,209,329 B1 | 4/2001 | Jones et al. |
| 6,209,590 B1 | 4/2001 | Mandsberg |
| 6,223,542 B1 | 5/2001 | Jones et al. |
| 6,244,388 B1 | 6/2001 | Yun |
| 6,250,794 B1 | 6/2001 | Huang |
| 6,261,050 B1 | 7/2001 | Kuhns |
| 6,267,049 B1 | 7/2001 | Silvano |
| 6,318,889 B1 | 11/2001 | Hansen, Sr. |
| 6,355,290 B1 | 3/2002 | Soehnlen et al. |
| 6,403,042 B1 | 6/2002 | Goeldner |
| 6,427,458 B1 | 8/2002 | Fowler |
| 6,494,049 B1 | 12/2002 | Jones et al. |
| 6,510,890 B1 | 1/2003 | Paskach et al. |
| 6,539,743 B2 | 4/2003 | Jones |
| 6,555,154 B2 | 4/2003 | Jones et al. |
| 6,584,995 B2 | 7/2003 | Kimbrough et al. |
| 6,659,113 B2 | 12/2003 | Wilcher |
| 6,679,083 B1 * | 1/2004 | Erickson ............... 62/484 |
| 6,915,896 B2 | 7/2005 | Jones |
| 2002/0129616 A1 | 9/2002 | Jones |
| 2003/0077364 A1 | 4/2003 | Feola |
| 2003/0216470 A1 | 11/2003 | Fink |

FOREIGN PATENT DOCUMENTS

| | | |
|---|---|---|
| CN | 1172146 C | 10/2004 |
| EP | 332287 | 9/1989 |
| EP | 641522 | 3/1995 |
| EP | 1068484 | 1/2001 |
| EP | 1362007 | 11/2003 |
| FR | 964921 | 3/1975 |
| GB | 1264439 | 2/1972 |
| GB | 1376972 | 12/1974 |
| GB | 2092880 | 8/1982 |
| GB | 2396400 | 6/2004 |
| JP | 780138049 | 11/1978 |
| JP | 790173530 | 12/1979 |
| JP | 55 064761 | 5/1980 |
| JP | 56 096667 | 8/1981 |
| JP | 900205121 | 8/1990 |

| JP | 04 091749 | 3/1992 |
| RU | 20315895 C | 3/1995 |
| WO | WO/1996/29896 | 10/1996 |
| WO | PCT/US1999/02091 | 2/1999 |
| WO | PCT/GB1999/01042 | 4/1999 |
| WO | WO/1999/39153 | 8/1999 |
| WO | WO/1999/51934 | 10/1999 |

OTHER PUBLICATIONS

Food Products Design article "The Ice Cream Evolution", pp. 5-6.
Dairy Science and Technology; pp. 2, 4, 5.
"Ice Cream" (6th Edition); Marshall, Goff, and Hartel; Kluwer Academic/Plenum Publishers; ISBN 0-306-47700-9.

* cited by examiner

TRAY FOR PRODUCING PARTICULATE FOOD PRODUCTS

FIELD OF THE INVENTION

This invention relates generally to a tray used in manufacturing particulate ice cream.

BACKGROUND OF THE INVENTION

Manufacturing particulate food products, such as beads of ice cream has become an increasingly profitable business. However, there can be a wide range in the sizes of frozen ice cream beads. Unfortunately, liquid particles or specks are sometimes released from the trays, which results in the formation of frozen fragments. The fragments are not only undesirable in appearance, but also adversely affect the collection of usable product. Thus, the formation of fragments introduces inefficiency into the process of preparing the frozen beaded ice cream products.

Accordingly, it is desired to eliminate the formation of frozen particulate fragments during product manufacture. Using advanced specialized welding, a structural modification can be made to a feed tray to make the feed tray more easily cleanable, more durable, yet still conform with USDA 3A sanitary requirements.

BRIEF SUMMARY OF THE INVENTION

This invention has as its primary objective a dropper assembly for feeding liquid composition to a freezing chamber which includes a tray overlying a freezing chamber. That tray is disposed to receive liquid composition from a delivery source and has a bottom wall with a plurality of orifices through which the received liquid composition is directed, as well as a plurality of projections extending perpendicular from a lower surface of the tray and for regulating discharge of the liquid composition from the tray and for feeding said liquid composition to said freezing chamber in uniformly sized droplets.

It is a further object of the present invention is to provide each of the plurality of projections being aligned in fluid communication with one of the plurality of orifices in the bottom wall of the tray, where the projections are affixed to the tray using a precision welding process. A further object of the present invention is to provide a method of operating the dropper assembly described above.

These and other objects and advantages of the invention will become readily apparent as the following description is read in conjunction with the accompanying drawings.

DETAILED DESCRIPTION OF THE PREFERRED EMBODIMENTS

Having summarized various aspects of the present invention, reference will now be made in detail to the description of the invention as illustrated in the drawings. While the invention will be described in connection with these drawings, there is no intent to limit it to the embodiment or embodiments disclosed therein. On the contrary, the intent is to cover all alternatives, modifications and equivalents included within the spirit and scope of the invention as defined by the appended claims.

Figure 1:
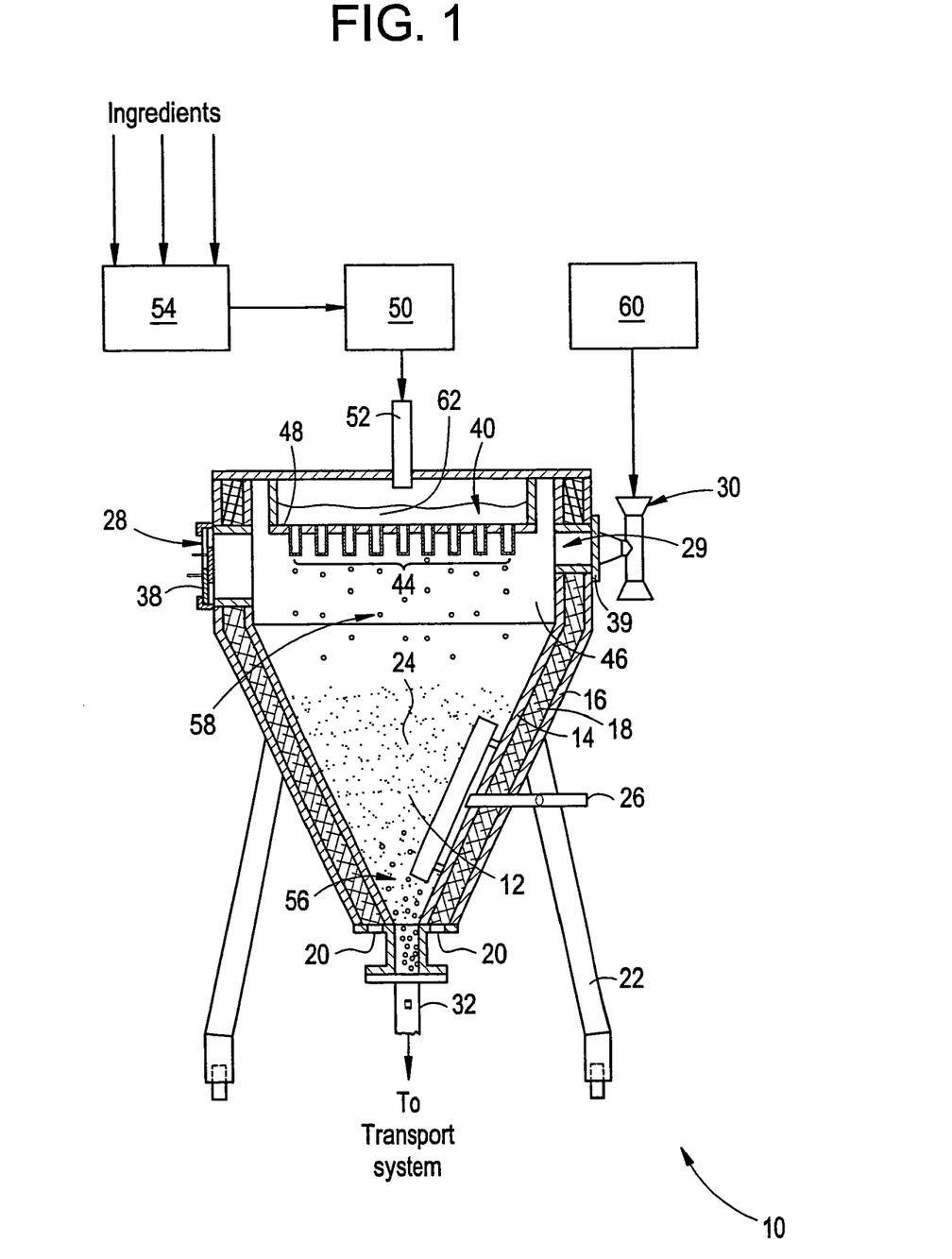
FIG. 1 shows a cryogenic processor of the present invention.
Figure 2:
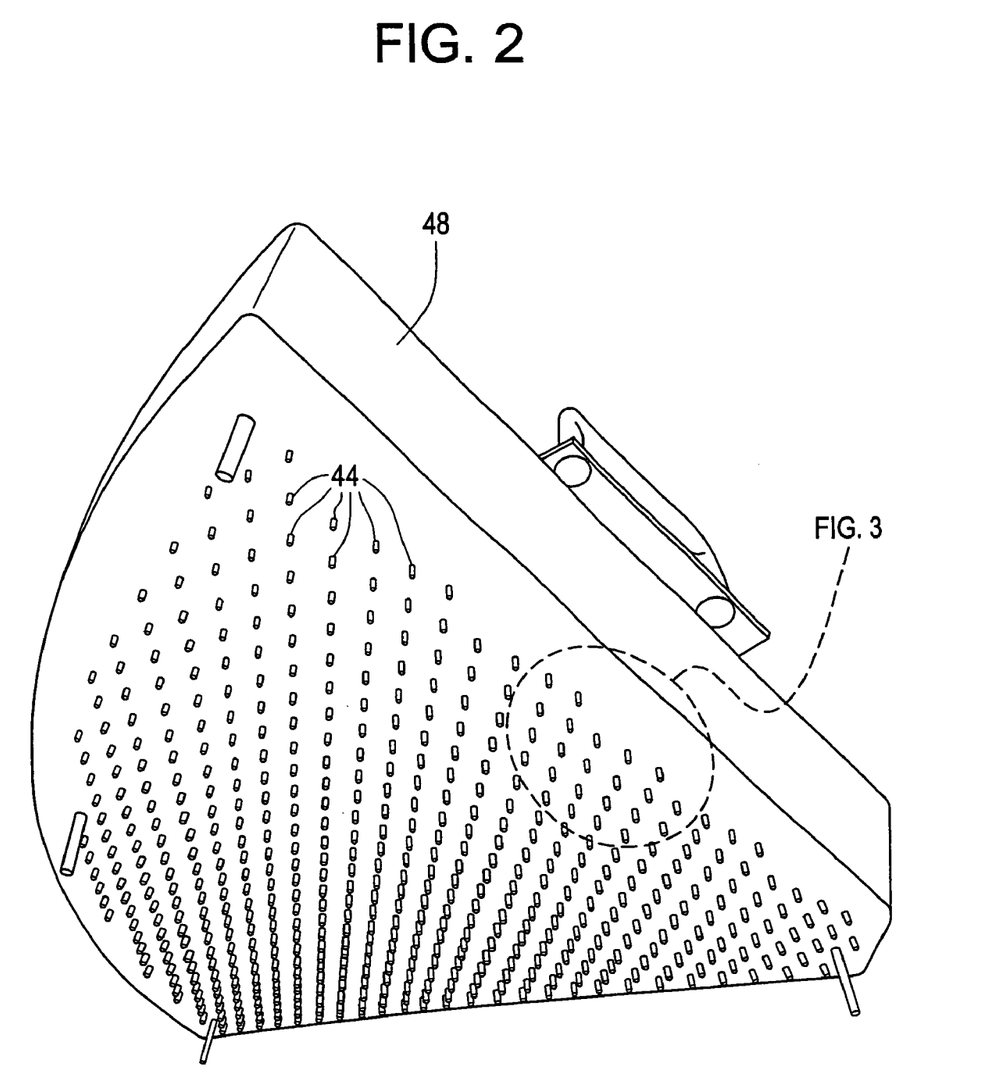
FIG. 2 is a perspective view of a tray within the cryogenic processor of FIG. 1.
Figure 3:
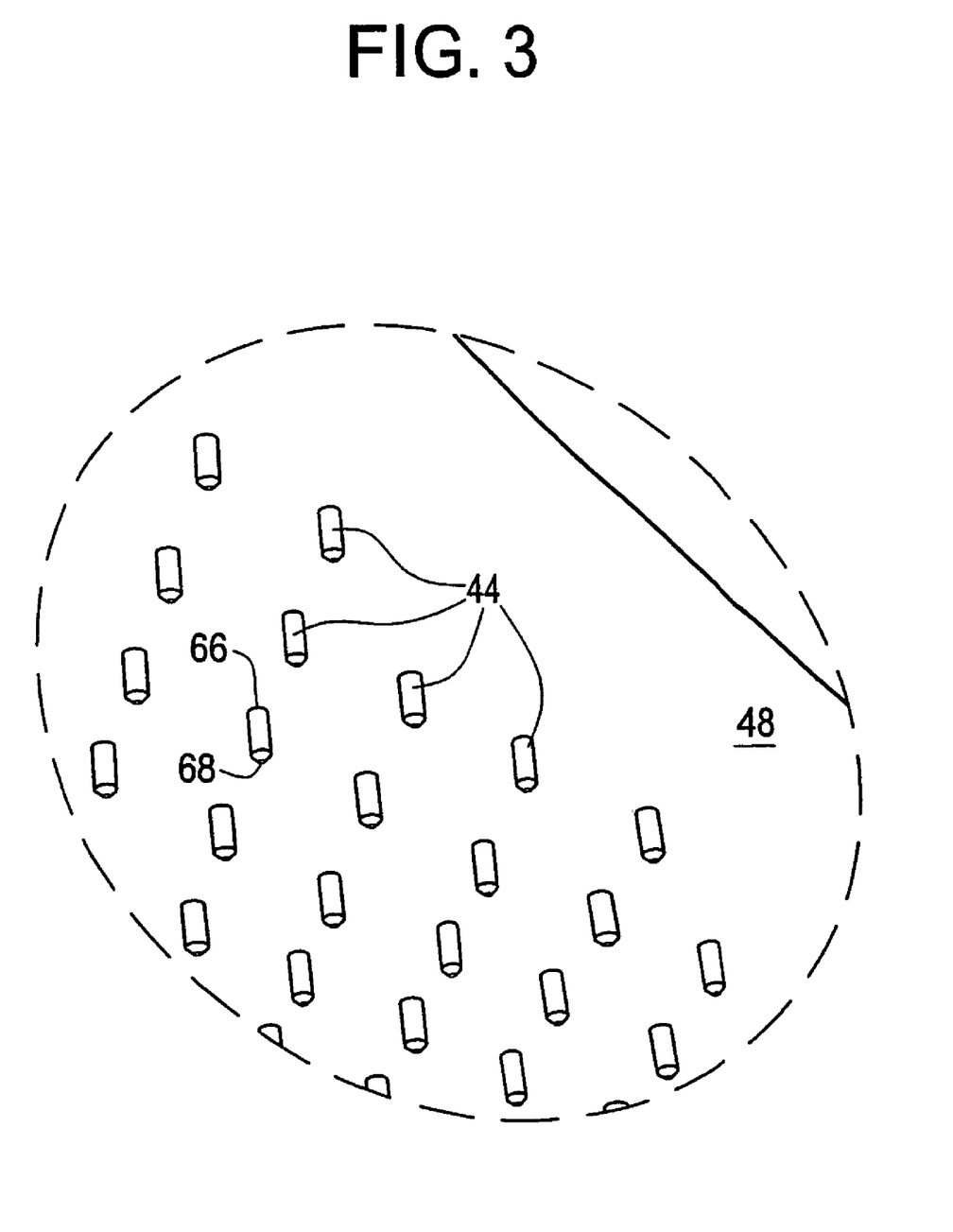
FIG. 3 is close-up view of the tray of FIG. 2.

FIG. 1 shows a cryogenic processor constructed in accordance with the preferred embodiment of the present invention to produce free-flowing frozen food products in the form of small beads. The fundamental method utilized to produce the product is described in detail in U.S. Pat. No. 5,126,156.

The cryogenic processor 10 includes a freezing chamber 12 that is most preferably in the form of a conical tank that holds a liquid refrigerant therein. The freezing chamber 12 incorporates an inner shell 14 and an outer shell 16. Insulation 18 is disposed between the inner shell 14 and outer shell 16 in order to increase the thermal efficiency of the chamber 12. Vents 20 are provided to ventilate the insulated area formed between the shells 14 and 16. The freezing chamber 12 is a free-standing unit supported by legs 22. Alternatively, the freezing chamber 12 may be disposed in a frame that is specially built to support the processor while in use.

A refrigerant 24, preferably liquid nitrogen in view of its known freezing capabilities, enters the freezing chamber 12 by means of refrigerant inlet 26. The refrigerant 24 entering chamber 12 through inlet 26 is used to maintain a predetermined level of liquid refrigerant in the freezing chamber and must be added to replace refrigerant 24 that is lost by evaporation or by other means incidental to production. Any gaseous refrigerant that has evaporated from the surface of the liquid refrigerant 24 in freezing chamber 12 primarily vents to the atmosphere through exit port 29 which cooperates with the vacuum assembly 30, which can be in the form of a venturi nozzle. Extraction of the frozen beads occurs through the product outlet 32 adapted at the base of the freezing chamber 12.

An ambient air inlet port 28 with adjustment doors 38 and exit port 29 with adjustment doors 39 are provided to adjust the level of gaseous refrigerant which evaporates from the surface of the liquid refrigerant 24 so that excessive pressure is not built up within the processor 10 and freezing of the liquid composition in the feed assembly 40 does not occur.

As shown in FIG. 1, a feed tray 48 receives liquid composition 62 from a delivery source 50. Typically, a pump drives the liquid composition 62 through a delivery tube 52 into the feed tray 48. A premixing device 54 allows several compositions, not all of which must be liquid, such as powdered flavorings or other additives of a size small enough not to cause clogging in the feed assembly 40, to be mixed in predetermined concentrations for delivery to the feed tray 48.

In order to create uniformly sized beads 56 of frozen food products, uniformly sized droplets 58 of liquid composition are required to be fed through gas diffusion chamber 46 to freezing chamber 12. The feed tray 48 works with the feed assembly 40 to form droplets 58 of the desired character. When the droplets 58 of liquid composition contact the refrigerant vapor in the gas diffusion chamber 46, beads 56 that are formed which fall to the bottom of chamber 12. A transport system connects to the bottom of chamber 12 at outlet 32 to carry the beads 56 to a packaging and distribution network for later delivery and consumption.

A vacuum assembly 30 cooperates with air inlet 28 and adjustment doors 38 so that an ambient air flow passes through the inlet and around feed assembly 40 to ensure that no liquid composition freezes therein. This is accomplished by mounting the vacuum assembly 30 and air inlet 28 on opposing sides of the gas diffusion chamber 46 such that the incoming ambient air drawn by the vacuum assembly 30 is aligned with the feed assembly. In this configuration, ambient air flows around the feed assembly warming it to a sufficient temperature to inhibit the formation of frozen liquid composition in the feed assembly flow channels. Air source 60, typically in the form of an air compressor, is attached to vacuum assembly 30 to provide appropriate suction to create the ambient air flow required.

FIG. 1 also shows a substantially rectangular tray 48 positioned above the freezing chamber 12 and extending completely across the top of the freezing chamber 12 along its minor dimension. However, the assembly 10 can have a very large tray 48 constructed to cover the entirety of the freezing chamber 12 or, alternatively, smaller trays 48 may be manufactured and placed side by side. In either case, in order to create uniformly sized beads 56 of frozen product, uniformly sized droplets 58 of liquid composition 62 are required to be fed to the freezing chamber 12. Accordingly, the tray 48 is designed to form droplets 58 of the desired character.

As shown in FIG. 2, the tray 48 preferably has a bottom surface and side walls which form an enclosure for receiving the liquid composition 62 from a source 34. Typically, a pump drives the liquid composition 62 through a delivery tube 52 into the tray 48. The liquid composition 62 is then fed to the freezing chamber 12 as is more fully discussed below.

As shown in FIG. 2, the bottom wall of the tray 48 is formed with a plurality of orifices which connect to projections 44. Preferably, the orifices are in an ordered array of rows and columns, although the present invention should not be considered as limited exclusively thereto. The liquid composition 62 flows into and through the orifices within the tray 48 in the direction of the freezing chamber 12 (usually downward) during the production process.

The projections 44 preferably extend downwardly from the bottom wall 30 of the tray 28 toward the freezing chamber 12. As shown in FIG. 3, each projection 44 thus has, at its first end 66, an inlet opening that is in communication with the associated orifice and, at its second end 68, an outlet opening. A flow channel extends the entire length of each projection 44 from the inlet opening 66 to the outlet opening 68.

The projections 44 can be cylindrical and uniform in cross-section, but can also taper to become narrower toward their second end 68 if desired. For purposes of illustration, FIGS. 1, 2, and 3 depict cylindrical, non-tapered projections 44 which can be more widely available than tapered projections. Where the projections 44 are tapered, the inlet opening has a larger dimension than the outlet opening. Such narrowing of the flow channel 54 promotes regulated accumulation of the liquid composition 20 within the flow channel of the projection 44 and thus promotes regulated discharge of the liquid composition from the tray 28.

Another way to promote regulated accumulation within the flow channel of the projection 44 is to fabricate the projection 44 to be at least 0.75 inches long. In either case, this design further allows a droplet 58 to be formed in orderly fashion until the net gravity force overcomes the interfacial tension forces on the droplet 58 and it falls toward the freezing chamber 12.

Droplets released from prior art orifices sometimes break apart into smaller droplets 58, creating fragmented beads 56 of widely varying sizes and also resulting in further spattering. Undersized beads 56 distract from the unique and pleasing appearance of the more desirably sized beads 56 and thus it is desired to eliminate them from the final product where possible. Furthermore, the spattering created during droplet release and/or break-up generates minute particles that also fall into the freezing chamber 12 and form particles of frozen microbeads that accumulate at the bottom of the freezing chamber 12. This creates the need to shut the production process down to clean out the freezing chamber 12. Furthermore, the frozen microbeads represent wasted mix 62.

To overcome these and other problems, the projections 44 of the present invention promote the regulated discharge of the liquid composition from the tray 48 and the formation of more uniformly sized droplets 58 of liquid composition 20 that, when delivered to the freezing chamber 12, form more uniformly sized beads 56 of frozen product. In addition, the projections 44 reduce the spattering of minute particles of liquid composition 20 and thus reduce the formation of frozen dust that has previously accumulated at the bottom of the freezing chamber 12.

As stated, it has been determined that the projections 44 having a length of at least 0.75 inches create less broken beads and unwanted fragments. Vacuum molded plastic trays can be manufactured to have these lengths for projections, but such plastic trays wear out more quickly and cannot withstand the high temperature cleaning cycles. It is thus desired to make the trays out of a heavier, more durable substance such as stainless steel. Steel trays are more durable, but manually welding steel trays is both painstaking and time-consuming. One solution to this is to use threaded pipettes for the projections, which can be screwed into a tray and then welded. Such threaded combinations assists in more consistent welds. However, such threaded assemblies do not conform to USDA 3A standards for food production, because contaminants can work their way into the threaded surfaces which are not removable by cleaning processes. Also, the surfaces of the threads may adhere inconsistently, so that any sugars within the food products passed therethrough can work their way inside the threaded surfaces and cause oxidization and premature wear on the projections 44.

To solve these and other problems, computerized welding techniques which create the weld by a lower temperature, higher precision fusion process can reduce these obstacles yet still accommodate the heavier tray materials. To that end, FIG. 4 shows an exemplary computer screen from a computerized welding software program. Using such a computer design mechanism, the desired welds can be first set up in software and then implemented by an automated welding process that has no human intervention but instead receives and is directed by a software program which interprets information from the computer screen shown in FIG. 4. This is advantageous because computerized fusion welds achieve greater accuracy than manual welds. Also, traditional welds have the problem of impurities and crud working their way into the weld thereby making the welded surface uneven, pocked or pitted, subject to breakage, and inconsistent in size. Because the tray 48 of the present invention may be used to make millions of beads 56 or other commercial food products every day, exact consistency of the projection 44 and flow channel therein is crucial. All projections 44 and corresponding flow channels must be exactly the same size. This consistency can be difficult and time-consuming to achieve with manual welds. However, computerized welding techniques lend themselves well to achieving this desired accuracy.

Figure 4:
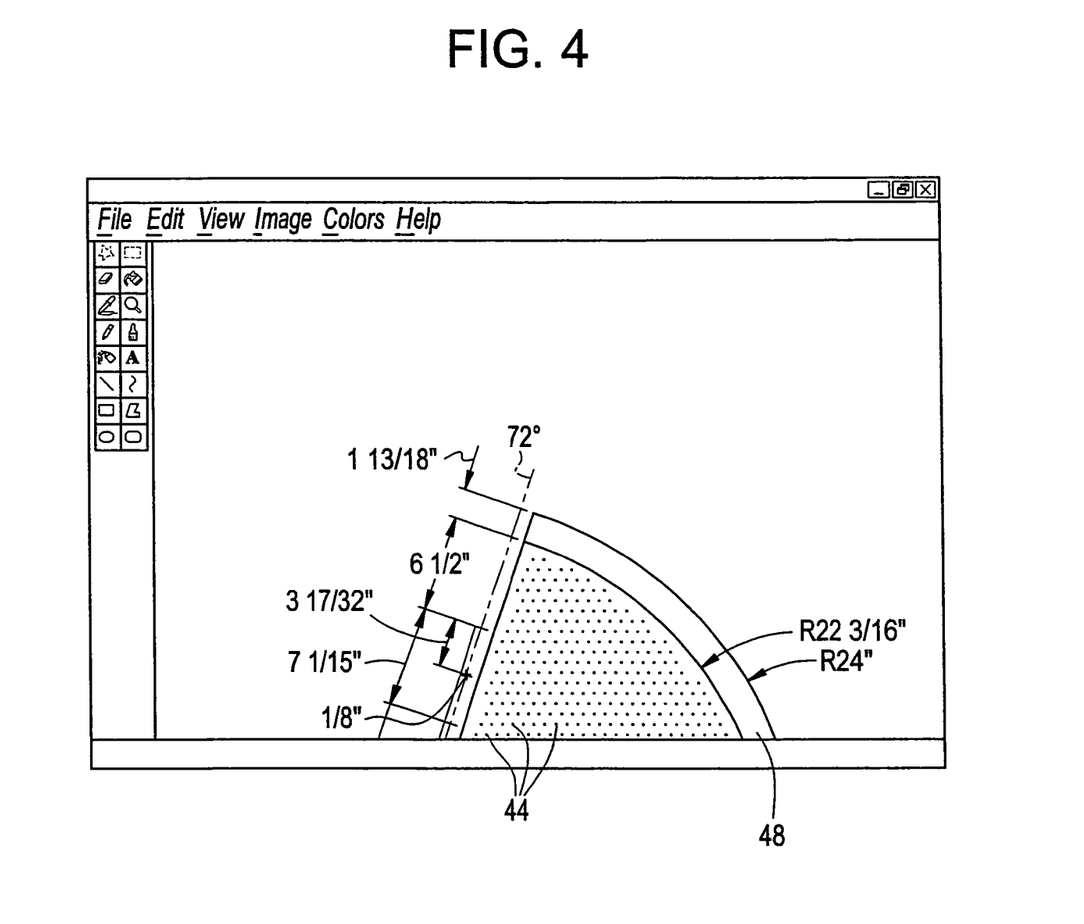
FIG. 4 shows a computer screen from a software program used in welding the tray of FIGS. 1-3.

The CAD drawing of a welding tray 48 shown in FIG. 4 provides specifications for a computerized fabrication mechanism. An operator can specify the type of weld, the technique used and the tolerances and finished appearance, i.e. buffed to 400 grit, to meet USDA 3A standards. Although not entirely shown in FIG. 4, there can be more than 500 projections 44 in a single tray 48. However, the actual number of projections 44 is not as important as their spacing, so that droplets 58 do not touch each other when falling into the vacuum chamber 12. This can result in forming clumps of beads 56 as the droplets 58 freeze, which is highly undesired.

The process used in the welding of the tray 48 can be an electron beam weld done in a vacuum chamber. This type of accuracy could also be performed by laser weld with a shielded gas or by gas tungsten arc weld (GTAW). The electron beam provides accuracy in penetration depth of the stainless material from which the tray 48 is formed. In a preferred embodiment, the entire welding process is controlled by computer with no human intervention. However, the tray 48 of the present invention could also be successfully achieved if done by a highly skilled welder. The main criteria is that the welded projections 44 meet USDA 3A standards for dairy equipment. Standards for dairy are different than from normal foods or FDA standards, in that dairy standards are more strict. The USDA 3A standard is generally accepted all over the world as a standard of safety for food producing equipment.

The computerized welding insures uniform penetration and no burn through as well as is less expensive due to lower hand labor involved. It is possible for good results to be obtained by hand welding but highly unlikely that a human could weld 500 or more projections 44 flawlessly with no craters or pits that would allow bacteria to settle. The projections 44 can be straight rather than tapered to be able to use readily available material off the shelf although tapered projections are acceptable also. The diameter and length of the projections 44 are important factors in that they govern the flow rate and the uniformity of the beaded product.

The present invention is easier to clean not only with detergents and sanitizers in a conventional cleaning in place (CIP) system, but can also be steam sterilized or autoclaved. One problem with plastic pipettes is that they sometimes fall into the freezing chamber 12 and then get mixed in within the beads 56. Being plastic, the broken pipettes could not be detected with metal detectors and were thus difficult to account for.

Figure 5:
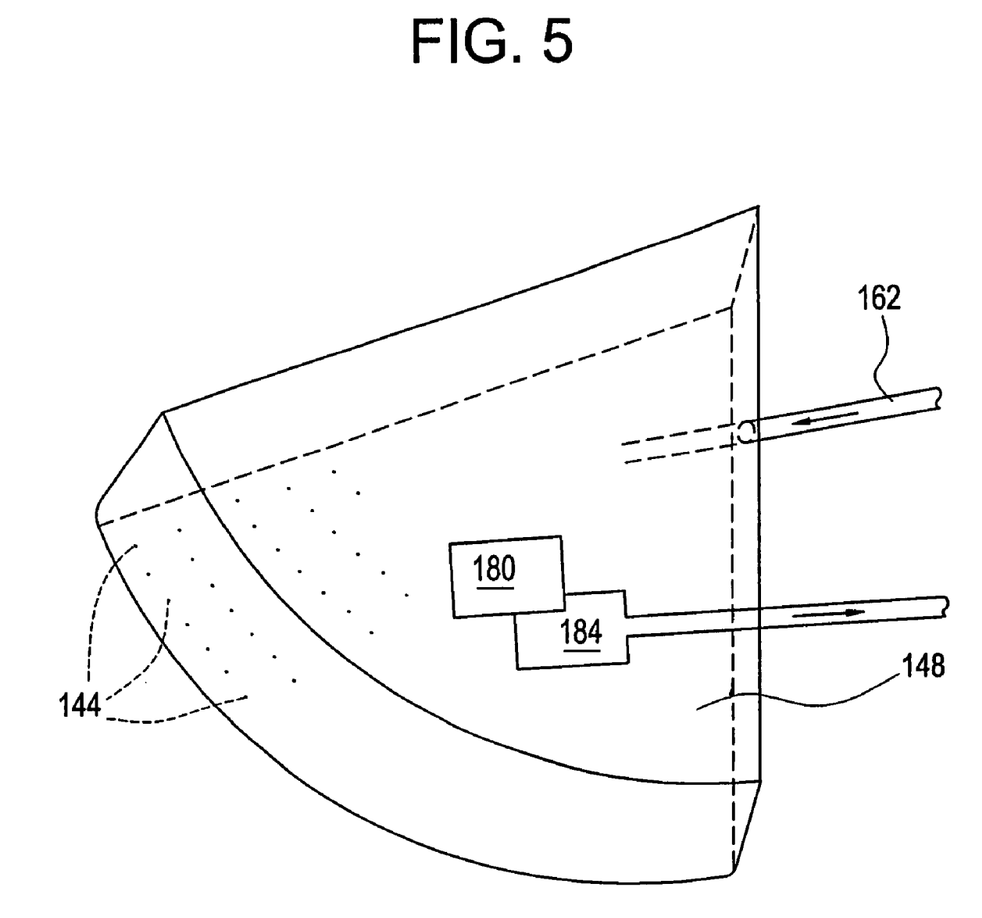
FIG. 5 shows an alternative embodiment of the present invention

FIG. 5 shows another embodiment of the present invention involving an enclosed tray 148 that can have a pulse pump 180 feeding it to produce a precise dosing action. In this embodiment, a stainless tray with approximately 1" depth has a cover welded or securely sealed to the top making it totally enclosed. The ice cream mix 162 can be delivered by a piston metering (pulse) pump 180, although other types of pumps are contemplated within the spirit and scope of the present invention. Once the enclosed tray 148 is filled, the feed is metered by piston pump to a precise volume. Each time the piston strokes, exactly one drop of mix comes out each of the array of projections 44. This method produces a precisely uniform droplet each time the piston stroked. As stated, the gravity methods described earlier can result in smaller droplets 158 forming immediately after a larger droplet 158 falls. This results in unwanted smaller beads 156 which can add up to as much as 15% of the amount of the total beads 156 produced, depending on the speed at which the cryogenic processor 10 is being operated. Thus, an enclosed tray 148 and accompanying dosing system can even further reduce the percentage of fragmented beads 156 thereby creating more uniformity in the product.

The pump 180 described above could be controlled by a programmable logic controller (PLC) that would be sensitive to the pressure within the enclosed tray 148. In an exemplary embodiment, the PLC could account for the number of trays being used and calculate the volume of mix to apply to the multiple trays 148. A pressure sensor and transmitter in each tray 148 would relay information back to the PLC to alter the signal to the pump as needed.

An enclosed tray 148 would have to have slightly smaller projections 44 and flow channels than those described in FIGS. 1-4, such as a 16 or 18 gauge depending on the viscosity of the product mix 162. This would be to prevent unwanted gravitational dropping thereof. These smaller gauge projections 44 should require a pressure beyond gravitational to produce the droplet.

As stated, a positive pressure piston pump 180 would be well suited for the application, but a similar effect could also be achieved with a lobe type positive displacement pump or even a paristaltic pump. As shown in FIG. 5, a pump pressure transmitter 184 could be attached to the top of the tray 148 with the sensing unit flush with the top of the tray 148, for easy removal. The pressure transmitter 184 could be placed anywhere and be functional, but it will be best for sanitary application to insert it through the top of the tray covering, and extend up out of the processor lid. A pump feed line would be in turn attached to the pressure transmitter 184 that is attached to the top of the tray also.

It is also a desired feature of the enclosed tray 148 that the size of the projection 144 be too small for gravity to pull the droplet through keeping the tray from forming droplets until a specific amount of pressure is applied. The intermittent action of the piston pump will cause the tray to pressurize forming a droplet, and depressurize when the droplet separates from the projection. This cycling of the pump at a specific RPM will keep the flow of droplets constant. By increasing the RPM, the flow of product will increase up to a limit in which the pressure would become great enough to make the liquid stream instead of exit in droplets. The pressure transmitter 184 will send the signals back to the PLC to maintain the pressure to the correct amount to provide for optimal droplet uniformity and production capacity.

The enclosed tray 148 of the present invention could be used in other applications other than low-temperature to provide uniform droplet sizes in food preparation. One possible alternative application would be in the preparation of chocolate. Another may be in the preparation of candies.

Both trays 48 and 148 can be cleaned by attaching the pump feed line to a Clean In Place (CIP) system, which is advantageous because it does not require disassembling the entire cryogenic processor 10. The CIP system would flood the tray and create pressure to stream the cleaning solution through the projections. A velocity of 5 feet per second is required to meet federal sanitation standards.

It is anticipated that various changes may be made in the arrangement and operation of the system of the present invention without departing from the spirit and scope of the invention, as defined by the following claims.

What is claimed is:

1. A dropper assembly for feeding liquid composition to a freezing chamber, comprising:
    at least one tray overlying a freezing chamber and disposed to receive liquid composition from a delivery source, said tray having a bottom wall with a plurality of orifices through which the received liquid composition is directed wherein the tray is enclosed and is responsive to a pulse pump operated using a piston;
    a plurality of projections extending perpendicular from a lower surface of said tray and disposed for regulated discharge of said liquid composition from said tray and for feeding said liquid composition to said freezing chamber in uniformly sized droplets, each of said plurality of projections being aligned in fluid communication with one of said plurality of orifices in said bottom wall of said tray; and
    a programmable logic controller configured to account for a number of trays being used and to calculate the volume of liquid composition to apply to each tray;
    wherein said projections are affixed to said orifices and said tray using a precision welding process.

2. The dropper assembly as in claim 1, wherein each of said projections is downwardly disposed in relation to said tray.

3. The dropper assembly as in claim 1, wherein each of said projections has a first end associated with said corresponding orifice and a second end spaced from said first end.

4. The dropper assembly as in claim 3, wherein each of said projections has an inlet opening associated with said first end and an outlet opening associated with said second end.

5. The dropper assembly as in claim 4, wherein each of said projections has a uniformly tapered flow channel extending from said inlet opening to said outlet opening.

6. The dropper assembly as in claim 4, wherein each of said projections has a cylindrical flow channel extending from said inlet opening to said outlet opening.

7. The dropper assembly of claim 1, wherein all surfaces conform to USDA 3A sanitary requirements for food surfaces.

8. The dropper assembly of claim 1, wherein said tray is a large tray constructed to cover the freezing chamber.

9. The dropper assembly of claim 8, wherein said tray has side walls attached to said bottom surface, wherein said side walls form an enclosure for receiving the liquid composition from an external source.

10. The dropper assembly of claim 1, wherein said projections are fabricated to be at least 0.75 inches long.

11. The dropper assembly of claim 1, wherein said dropper assembly is used to produce millions of beads or other commercial food products per day.

12. The dropper assembly of claim 5, wherein all projections and corresponding flow channels are exactly the same size.

13. The dropper assembly of claim 1, wherein each of said projections is welded to the tray by computerized welding techniques using a low temperature, high precision fusion welding process.

14. The dropper assembly of claim 13, wherein said welding process is an electron beam weld performed in a vacuum chamber.

15. The dropper assembly of claim 13, wherein said fusion welding process is a laser weld using shielded gas.

16. The dropper assembly of claim 13, wherein said fusion welding process further comprises gas tungsten arc welding.

17. The dropper assembly of claim 13, wherein the projections are attached to the tray using manual welds.

18. The dropper assembly of claim 1 wherein each time the piston strokes, exactly one drop of liquid composition comes out each of the array of projections.

19. The dropper assembly of claim 18, wherein size of the orifice within each of said projections is significantly small that gravity may not pull a droplet therethrough, without also applying a predetermined amount of pressure.

20. The dropper assembly of claim 18, wherein the enclosed tray is used in the preparation of chocolate, and or candy food products.

21. The dropper assembly of claim 1, wherein said tray comprises a plurality of smaller trays which combine to cover the freezing chamber.

22. The dropper assembly of claim 21, wherein a pressure sensing unit and transmitter within each of the plurality of trays relays information back to the programmable logic controller to alter the signal to the pump as needed.

23. The dropper assembly of claim 22, wherein said pressure sensing unit is located flush with the top of the tray, is inserted through the top of a tray covering, and extends upward out of a processor lid.

24. The dropper assembly of claim 22, wherein a pump feed line is attached to the pressure transmitter.

25. The dropper assembly of claim 24, wherein the tray is cleaned by attaching the pump feed line to a clean in place system, which floods the tray with cleaning liquid and creates pressure to stream the cleaning solution through the projections.

26. The dropper assembly of claim 25, wherein said clean in place system operates at a velocity of 5 feet per second.

* * * * *